(12) United States Patent  
Koutensky

(10) Patent No.: US 8,213,194 B2
(45) Date of Patent: Jul. 3, 2012

(54) CONTROL DEVICE FOR A FLYBACK CONVERTER

(75) Inventor: Pavel Koutensky, Prague (CZ)

(73) Assignee: STMicroelectronics Design and Application S.R.O., Prague (CZ)

( * ) Notice: Subject to any disclaimer, the term of this patent is extended or adjusted under 35 U.S.C. 154(b) by 143 days.

(21) Appl. No.: 12/782,467

(22) Filed: May 18, 2010

(65) Prior Publication Data

US 2010/0295470 A1    Nov. 25, 2010

(30) Foreign Application Priority Data

May 19, 2009   (IT) .............................. MI2009A0870

(51) Int. Cl.
*H02M 3/335*   (2006.01)
*H05B 37/02*   (2006.01)
*H05B 39/02*   (2006.01)
*H05B 39/04*   (2006.01)
*H05B 41/36*   (2006.01)
*H05B 41/16*   (2006.01)
*H05B 41/24*   (2006.01)
*H05B 37/00*   (2006.01)
*H05B 39/00*   (2006.01)
*H05B 41/00*   (2006.01)

(52) U.S. Cl. .............. 363/21.18; 363/21.12; 315/209 R; 315/210; 315/224; 315/246; 315/250; 315/276; 315/291; 315/294; 315/307; 315/308; 315/312; 315/360

(58) Field of Classification Search .................. None
See application file for complete search history.

(56) References Cited

U.S. PATENT DOCUMENTS

| 7,388,764 | B2 * | 6/2008 | Huynh et al. ............... 363/21.16 |
| 2004/0080273 | A1 | 4/2004 | Ito et al. |
| 2007/0121349 | A1 | 5/2007 | Mednik et al. |

OTHER PUBLICATIONS

STMicroelectronics, "VIPower: Dimmable White LEDS Power Supply with VIPer53," AN2067 Application Note, Nov. 2004, pp. 1-15.
STMicroelectronics, "VIPower: Offline constant current LED driver using VIPer12/22A," AN1916 Application Note, Aug. 2006, pp. 1-45.

\* cited by examiner

*Primary Examiner* — Douglas W Owens
*Assistant Examiner* — Dedei K Hammond
(74) *Attorney, Agent, or Firm* — Seed IP Law Group PLLC

(57) ABSTRACT

A control device for regulating the constant output current of a flyback converter, the control device adapted to control the on time period and the off time period of a primary winding switch and including a first circuit adapted to multiply a first signal representative of current flowing through the primary winding and a second signal representative of an input voltage and outputting a signal representative of the multiplication, a second circuit adapted to compare the output signal of the first circuit and a third signal representative of the direct output voltage, the control device determining, on the basis of the output signal of the second circuit, the on time period and the off time period of the switch so that the output signal of the first circuit is equal to the signal representative of the direct output signal to have the output current of the flyback converter constant.

19 Claims, 2 Drawing Sheets

CONTROL DEVICE FOR A FLYBACK CONVERTER

BACKGROUND

1. Description of the Related Art

The present disclosure refers to a control device for a flyback converter.

2. Description of the Related Art

Flyback converters are known in the state of the art as DC to DC converters with a galvanic isolation between the input and the output. More precisely, the flyback converter is a buck-boost converter with the inductor split to form a transformer, so that the voltage ratios are multiplied with an additional advantage of isolation. The transformer includes a primary winding connected with the input of the converter and a secondary winding connected with the output of the converter.

A flyback converter can be used to supply LED diode chains.

Recently high brightness LEDs are becoming a prominent source of light and often have better efficiency and reliability when compared to that of conventional light sources. While LEDs can operate from an energy source as simple as a battery and resistor, most applications require an efficient energy source not only for the reduction of losses, but also for the lumen maintenance of the LED itself. For these reasons driving circuits for high brightness LEDs have been developed; these driving circuits assure a constant current to the LEDs.

Two of these circuits are the VIPer12A and VIPer22A developed by STMicroelectronics; they are integrated switching regulators capable of providing a constant current to the LEDs. VIPer12A and VIPer22A use typically secondary regulation for keeping the output current constant, that is the current of the LEDs, because it is necessary for proper LED driving. In fact the controller of the power switch of the flyback converter in VIPer12A and VIPer22A needs a feedback signal derived from the secondary side (the circuit part of the flyback converter that is coupled to the secondary winding of the transformer) to control the switch and to produce a constant output current. Secondary regulation also needs an optocoupler, several passive components, and an active component. If the output voltage is too high, for example higher than 36 V, it is even necessary to use additional secondary windings on the transformer to generate a proper supply voltage for secondary part as it is shown in the application notes AN2067 and AN1916 (documents AN2067 and AN1916 are available on the STMicroelectronics web site).

The main drawback for the circuits VIPer12A and VIPer22A is due to the use of numerous components with secondary regulation, which make them complex and increase the cost and size, as the use of the optocoupler to separate the feedback signal from secondary to primary side. Also, an additional secondary winding on the transformer is needed for high output voltage, higher than 36 V, to generate proper supply voltage for the secondary side.

In view of the state of the art, the present disclosure provides a control device for a flyback converter that has fewer components than the known circuits.

BRIEF SUMMARY

According to the present disclosure, a control device for regulating the constant output current of a flyback converter is provided. The flyback converter includes an input voltage and outputs a direct output voltage with a constant output current to supply a load. The flyback converter has a transformer with a primary winding coupled with the direct input voltage and a secondary winding coupled with the direct output voltage, and further including a switch coupled to the primary winding to regulate the current flowing through the primary winding and to regulate the output direct voltage. The control device is adapted to control the switch determining the on time period and the off time period of the switch. The control device further includes a first circuit adapted to multiply a first signal representative of the current flowing through the primary winding and a second signal representative of the input voltage and outputting a signal representative of the multiplication, a second circuit adapted to compare the output signal of the first circuit, and a third signal representative of the direct output voltage, the control device adapted to determine, on the basis of the output signal of the second circuit, the on time period and the off time period of the switch so that the output signal of the first circuit is made equal to the third signal representative of the direct output voltage and to have the output current of the flyback converter maintain a constant value.

In accordance with one aspect of the present disclosure, a circuit is provided that includes a current supply circuit coupled to a load to supply a current to the load; a control circuit coupled to the current supply circuit to maintain a constant current level of the current supplied to the load, the control circuit including an auxiliary primary winding in a transformer in the current supply circuit adapted to sense a direct output voltage from a secondary winding in the transformer and to output a representative signal of the direct output voltage; a first circuit structured to multiply a signal representative of current flowing in the primary winding and a second signal representative of an input voltage to the primary winding in the transformer and to output a multiplied signal that is representative of the product of the multiplication; a second circuit coupled to the auxiliary primary winding and structured to compare the multiplied signal with the representative signal of the direct output voltage and to output a comparison signal; and a driving circuit structured to receive the comparison signal and to generate a driving signal to a switch in the current source to maintain the current to the load at a constant level.

In accordance with another aspect of the present disclosure, the control circuit includes an auxiliary primary winding in the transformer adapted to sense the direct output voltage and to output the representative signal of the direct output voltage.

In accordance with the present disclosure, the representative signal of the current in the primary winding represents an average primary current flowing through the primary winding.

In accordance with another aspect of the present disclosure, the driving circuit referenced above is formed of a pulse width modulation circuit that is ideally structured to determine a turn on time period and a turn off time period of the switch. Preferably, the driving circuit controls the switch so that a value of the representative signal of the direct output voltage is equal to a value of the multiplied signal.

In accordance with another aspect of the present disclosure, a control circuit for a flyback circuit that supplies a load with an output current is provided. The flyback circuit has a transformer with a primary winding that receives an input voltage and a secondary winding that outputs a direct output voltage with the output current, and a switch coupled to the primary winding to regulate current through the primary winding and, thus, the output current of the transformer, the control circuit including a first circuit structured to multiply a first signal representative of the current through the primary winding and a second signal representative of the input voltage to the primary winding and to output a multiplied signal that is a product of the multiplication; a second circuit structured to compare the multiplied signal with a signal representative of the direct output voltage and to output a comparison signal; and a driving circuit structured to receive the comparison signal and to generate a driving signal to the switch to maintain the output current constant.

In accordance with another aspect of the present disclosure, a method is provided for regulating the output current of a flyback converter. The flyback converter has an input voltage and outputs a direct output voltage with an output current to supply a load, the flyback converter having a transformer with a primary winding receiving an input voltage and a secondary winding that outputs the direct output voltage, and a switch coupled to the primary winding to regulate the current flowing through the primary winding and thereby regulate the direct output voltage, the method including determining the on time period and the off time period of the switch by multiplying a first signal representative of current flowing through the primary winding and a second signal representative of the input voltage, comparing a signal generated by the multiplication and a third signal representative of the direct output signal, determining the on time period and the off time period of the switch as a function of the signal generated from the comparison so to make equal the signal representative of the multiplication and the third signal representative of the direct output signal in order to have the output current of the flyback converter maintain a constant value.

In accordance with another aspect of the method of the present disclosure, a control method for regulating the output current of a flyback converter is provided, said flyback converter having an input voltage and outputting a direct output voltage with a the output current to supply a load, the flyback converter having a transformer with a primary winding receiving an input voltage and a secondary winding that outputs the direct output voltage, and a switch coupled to the primary winding to regulate the current flowing through the primary winding and regulate the output direct voltage, the method including determining the on time period and the off time period of the switch by multiplying a first signal representative of the current flowing through the primary winding and a second signal representative of the input voltage, comparing a signal generated by the multiplication and a third signal representative of the direct output signal, determining the on time period and the off time period of the switch as a function of the signal generated from the comparison so to make equal the signal representative of the multiplication and the third signal representative of the direct output signal to thereby have the output current of the flyback converter maintain a constant value.

In accordance with yet a further aspect of the method of the present disclosure, the method includes obtaining the third signal from an auxiliary primary winding in the transformer, which is adapted to sense the direct output voltage and to generate the third signal as a representative signal of the direct output voltage.

In accordance with yet a further aspect of the method of the present disclosure, comparing a signal generated by the multiplication and a third signal representative of the direct output signal results in the generation of a comparison signal, and determining the on time period and the off time period of the switch further includes generating a driving signal with a pulse width modulation circuit adapted to determine the on time period and the off time period of the switch by comparing the comparison signal and a triangular waveform generated by an oscillator in the driving circuit.

BRIEF DESCRIPTION OF THE SEVERAL VIEWS OF THE DRAWINGS

The features and advantages of the present disclosure will become apparent from the following detailed description of one embodiment thereof, illustrated only by way of non-limitative example in the annexed drawings, in which.

DETAILED DESCRIPTION

Figure 1:
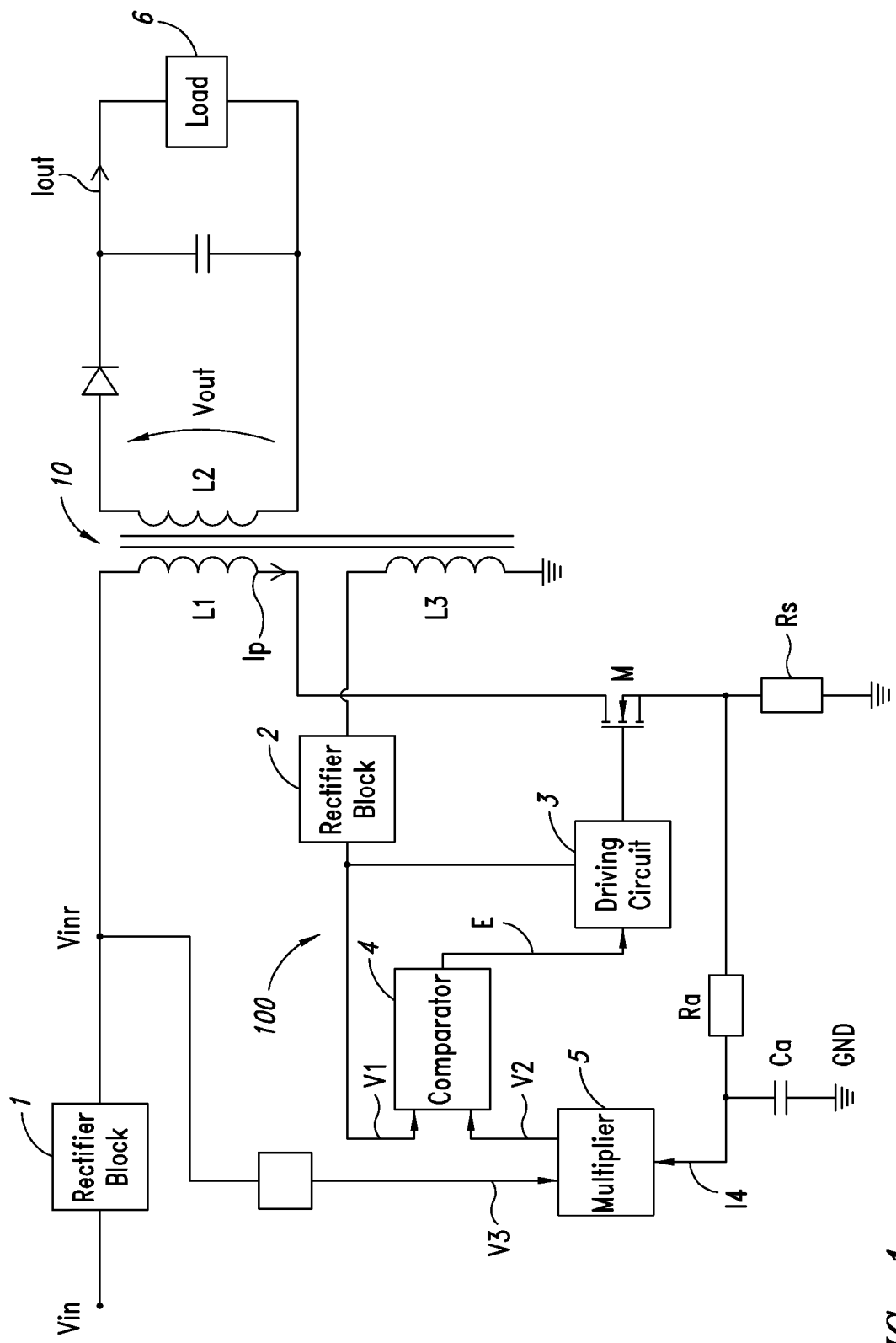
FIG. 1 is a scheme of a flyback converter comprising a control device according to the present disclosure.

A schematic of a flyback converter having a control device according to the present disclosure is shown in FIG. 1. The flyback converter includes a rectifier block 1 adapted to rectify an input voltage Vin for obtaining a voltage Vinr, a transformer 10 having a primary winding L1 and a secondary winding L2, a switch M connected with the primary winding L1 and coupled to ground GND, preferably an NMOS transistor having the drain terminal connected with a terminal of the primary winding L1 and the source terminal coupled to ground GND by means of a resistance Rs; the primary winding L1 having one terminal connected with the switch M and the other terminal coupled to the input voltage Vin, particularly with the input voltage Vinr. A current Ip flows though the primary winding L1 while a constant current Iout flows through the load 6; and an output voltage Vout is present across the secondary winding L2.

The transistor M is driven by a control device 100 comprising an auxiliary winding L3 of the transformer 10 adapted to sense the reflected output voltage Vout and to generate a supply voltage for a driving circuit 3 adapted to drive the NMOS transistor M. The auxiliary winding L3 has one terminal connected with ground GND and the other terminal connected with a rectifier block 2 that provides the voltage Vrout to supply the driving circuit and the voltage V1 at the input terminal of a comparator 4 adapted to compare the voltage V1 with another voltage V2.

The voltage V2 is the output voltage of a multiplier 5 that is adapted to multiply a voltage V3 representative of the rectified input voltage Vinr from a voltage divider 13 and a signal 14 representative of the average primary current flowing through the primary winding of the flyback converter. Particularly the signal 14 is the current flowing through a circuit comprising a capacitor Ca having one terminal connected to ground GND and the other terminal connected with the input of the multiplier 5 and with a terminal of a resistance Ra connected with the sensing resistance Rs and the source terminal of the transistor M.

The output signal E of the comparator is at the input of the driving circuit 3 adapted to regulate the output power of the flyback converter. Preferably the driving circuit 3 is a PWM (Pulse width Modulation) circuit adapted to determine the time period Ton for the turning on of the transistor M and the time period Toff for the turning off of the transistor M by comparing the signal E and a triangular waveform generated by an oscillator preferably internal to the driving circuit 3.

The driving circuit 3 on the basis of the signal E is adapted to control the switch M so that the signal V1 is made equal to the signal V2 to have the constant output current Iout of the flyback converter.

In fact V1=K1*Vout, V3=K3*Vinr and I4=K4*Ip wherein K1, K3 and K4 are constants. In the multiplier 5 the signal V3 is multiplied by the signal I4 obtaining V2=V3*I4=K4*K3*Vinr*Ip=K4*K3*Vinr*Pin/Vinr=K4*K3*Pin because the input power at the primary side of the flyback converter is Pin=Vinr*Ip. Also since the input power Pin is proportional to the output power of the flyback converter Pin=Pout*K2=Vout*Iout*K2, wherein K2 is a constant, it has V2=K4*K3*Iout*Vout*K2=K5* Iout*Vout where K5 is a constant.

Figure 2:
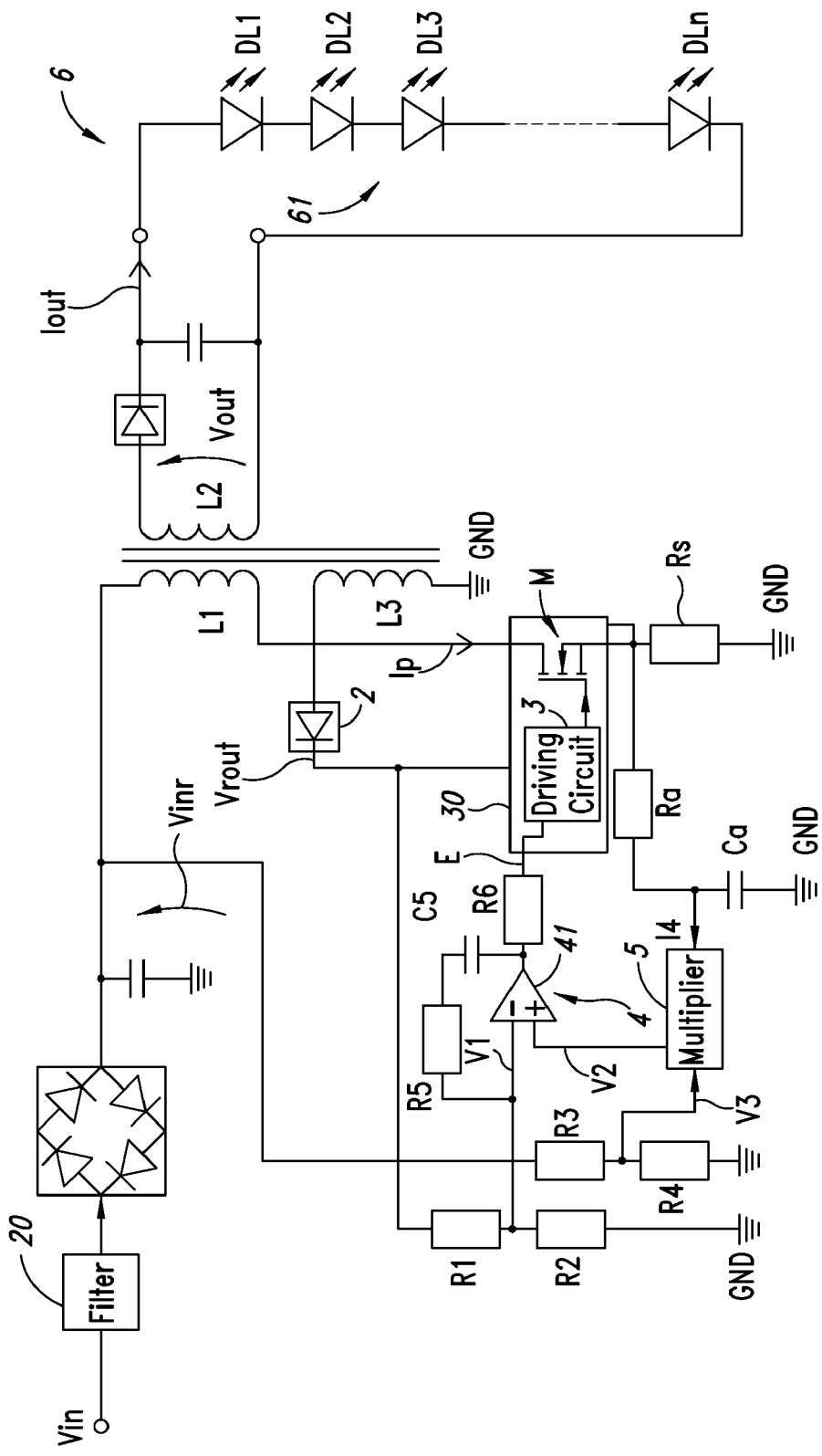
FIG. 2 is an electric scheme of the flyback converter in FIG. 1.

The signals V1 and V2 at the input terminals of the comparator 4 must be equal; in fact the comparator includes, as better shown in FIG. 2, an operational amplifier 41 having the inverting input terminal coupled with the output terminal by means of a series of a resistor R5 and a capacitor C5; the voltage V1 is present at the inverting input terminal of the operational amplifier while the voltage V2 is present at a non inverting input terminal. If the signals V1 and V2 are not equal, the control device according to the present disclosure reacts, driving the switch M so as to change the value of the current Ip and the value of the output voltage so that V1=V2. The driving circuit 3 is adapted to change the on time period Ton and the off time period Toff of the switch M and to consequently modify the current Ip flowing through the primary winding L1.

Also V1=V2, that is K1*Vout=K5* Iout*Vout and Iout=K1*K5=K, where K is a constant.

As shown in FIG. 2, the flyback converter has a filter 20 to filter the input voltage Vin before the rectifier block 1. The voltage V3 is produced by means of a resistor divider formed by the series of the resistances R3 and R4 arranged across the voltage Vinr, that is V3=R4*Vinr/(R3+R4).

The voltage V1 is produced by means of a resistor divider formed by the series of the resistances R1 and R2 coupled with the terminal of the auxiliary winding L3, that is V1=R2*Vrout/(R1+R2).

The rectifier block 2 is a diode and a circuit block is provided between the secondary winding and the load 6, which is formed by a diode having the anode connected with a terminal of the secondary winding L2 and the cathode connected with a terminal of a capacitor having the other terminal connected with the other terminal of the capacitor; across the capacitor is arranged the load 6.

The load 6 preferably includes one chain 61 of LED diodes wherein the LED diodes DL1, DL2 . . . DLn are arranged in series; the load 6 can include a plurality of chains of LED diodes wherein each chain of the plurality is made as the chain 61. Even preferably the LED diodes are high brightness LED diodes. The circuit described herein maintains a constant, uniform visible brightness of these diodes, which can be used for illuminating an area, providing visual indication of a condition, and other uses known in the art.

As shown in FIG. 2 the driving circuit 3 and the switch M, in particular the NMOS transistor M, are integrated together by forming an integrated circuit 30. The circuit 30 has at the input terminals the voltage Vrout to supply the integrated circuit 30, one terminal of the primary winding L1, one terminal of the resistance Rs and the signal E deriving from the comparator 4.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:
   a current supply circuit having a switch and a transformer that includes a primary winding and a secondary winding and configured to supply a load current;
   a control circuit coupled to the current supply circuit and configured to maintain a constant current level of the current, the control circuit including:
   an auxiliary primary winding in the transformer of the current supply circuit adapted to sense a direct output voltage from the secondary winding in the transformer and to output a representative signal of the direct output voltage;
   a first circuit structured to multiply a signal representative of current flowing through the primary winding and a signal representative of an input voltage to the primary winding in the transformer and to output a multiplied signal that is representative of the product of the multiplication;
   a second circuit coupled to the auxiliary primary winding and structured to compare the multiplied signal with the representative signal of the direct output voltage and to output a comparison signal; and
   a driving circuit structured to receive the comparison signal and to generate a driving signal to the switch in the current supply circuit to maintain the load current at a constant level.

2. The circuit of claim 1 wherein the signal representative of the input voltage to the primary winding represents an average primary current flowing through the primary winding.

3. The circuit of claim 1 wherein the driving circuit comprises a pulse width modulation circuit structured to determine a turn on time period and a turn off time period of the switch.

4. The circuit of claim 3 wherein the driving circuit includes an oscillator configured to generate a triangular waveform signal, and the driving circuit is structured to compare the comparison signal to the triangular waveform signal to determine the turn on and turn off time periods.

5. The circuit of claim 1 wherein the driving circuit is adapted to control the switch so that the representative signal of the direct output voltage maintains a value equal to a value of the multiplied signal.

6. The circuit of claim 1 further comprising a plurality of series-connected LED diodes configured to receive the load current.

7. A control circuit for a flyback circuit that supplies a load with an output current, the flyback circuit having a transformer with a primary winding that receives an input voltage and a secondary winding that outputs a direct output voltage with the output current, and a switch coupled to the primary winding to regulate current through the primary winding and the output current of the transformer, the control circuit comprising:

a first circuit structured to multiply a first signal representative of current through the primary winding and a second signal representative of the input voltage to the primary winding and to output a multiplied signal that is a product of the multiplication;

a second circuit structured to compare the multiplied signal with a signal representative of the direct output voltage and to output a comparison signal; and a driving circuit structured to receive the comparison signal and to generate a driving signal to the switch to maintain the output current constant.

8. The control circuit of claim 7, comprising an auxiliary primary winding in the transformer adapted to sense the direct output voltage and to output the signal representative of the direct output voltage.

9. The circuit of claim 8 wherein the second signal representative of the current through the primary winding represents an average primary current flowing through the primary winding.

10. The control circuit of claim 7 wherein the driving circuit comprises a pulse width modulation circuit.

11. The circuit of claim 7 wherein the driving circuit is adapted to control the switch so that the representative signal of the direct output voltage maintains a value that is equal to a value of the multiplied signal.

12. The circuit of claim 7 wherein the first circuit comprises a multiplier having a first input to receive the signal representative of a current through the primary winding and a second input to receive the second signal representative of the input voltage, and an output on which is generated the multiplied signal, the output coupled to an input of the second circuit, the second circuit including a comparator having a further input to receive the signal representative of the direct output voltage and an output on which is generated the comparison signal.

13. A circuit, comprising:
a flyback converter configured to receive an input voltage and output a direct output voltage with a constant output current, the flyback converter having;
  a transformer with a primary winding structured to receive the input voltage and a secondary winding structured to output the direct output voltage; and
  a switch coupled to the primary winding to regulate the current flowing through the primary winding and to regulate the output direct voltage, the control device adapted to control the switch to determine the on time period and the off time period of the switch;
a first circuit adapted to multiply a first signal representative of the current flowing through the primary winding and a second signal representative of the direct input voltage and to output a signal representative of the multiplication;
a second circuit adapted to compare the output signal of the first circuit and a third signal representative of the direct output voltage; and a control device adapted to determine, on the basis of the output signal of the second circuit, the on time period and off time period of the switch to make the output signal of the first circuit equal to the third signal representative of the direct output signal and maintain constant the output current of the flyback converter.

14. The circuit of claim 13 wherein the first signal is a signal representative of an average primary current flowing through the primary winding of the flyback converter.

15. The circuit of claim 13 wherein the flyback converter comprises an auxiliary winding adapted to sense a reflected output voltage and to determine the third signal using a resistor divider.

16. The circuit of claim 13 wherein the control device is adapted to control the switch by pulse width modulation wherein the output signal of the second circuit is compared to a triangular waveform.

17. A control method for regulating the output current of a flyback converter, said flyback converter having an input voltage and outputting a direct output voltage with an output current, the flyback converter having a transformer with a primary winding receiving an input voltage and a secondary winding that outputs the direct output voltage, and a switch coupled to the primary winding to regulate the current flowing through the primary winding and regulate the direct output voltage, the method comprising:
determining an on time period and the off time period of the switch by:
  multiplying a first signal representative of current flowing through the primary winding and a second signal representative of the input voltage,
  comparing a signal generated by the multiplication and a third signal representative of the direct output voltage, and
  determining the on time period and the off time period of the switch as a function of the signal generated from the comparison so to make equal the signal representative of the multiplication and the third signal representative of the direct output voltage and to have the output current of the flyback converter maintain a constant value.

18. The method of claim 17, comprising obtaining the third signal from an auxiliary primary winding in the transformer that is adapted to sense the direct output voltage and to generate the third signal as a representative signal of the direct output voltage.

19. The method of claim 17 wherein comparing the signal generated by the multiplication and the third signal representative of the direct output voltage results in the generation of a comparison signal, and determining the on time period and the off time period of the switch further comprises generating a driving signal with a pulse width modulation circuit adapted to determine the on time period and the off time period of the switch by comparing the comparison signal and a triangular waveform generated by an oscillator in the driving circuit.

* * * * *

UNITED STATES PATENT AND TRADEMARK OFFICE
CERTIFICATE OF CORRECTION

PATENT NO.         : 8,213,194 B2                                    Page 1 of 1
APPLICATION NO.    : 12/782467
DATED              : July 3, 2012
INVENTOR(S)        : Pavel Koutensky It is certified that error appears in the above-identified patent and that said Letters Patent is hereby corrected as shown below:

Column 7, Line 11:
"the output current constant." should read, --the output current to the load at a constant level.--.

Column 7, Line 38:
"current, the flyback converter having;" should read, --current, the flyback converter having:--.

Column 7, Line 44:
"regulate the output direct voltage, the control device" should read, --regulate the direct output voltage, the control device--.

Column 8, Line 5:
"of the direct output signal and maintain" should read, --of the direct output voltage and maintain--.

Signed and Sealed this
Sixth Day of November, 2012

David J. Kappos
*Director of the United States Patent and Trademark Office*